United States Patent

[11] 3,615,599

| [72] | Inventors | Yoshizo Sakamoto;<br>Kazuyasu Sakamoto, both of 1166 Oaza Shimootome, Yokkaichi-Machi, Usa-gun, Japan |
|---|---|---|
| [21] | Appl. No. | 635,099 |
| [22] | Filed | May 1, 1967 |
| [45] | Patented | Oct. 26, 1971 |
| [32] | Priority | May 17, 1966 |
| [33] | | Japan |
| [31] | | 41/31289 |

[54] METHOD OF AND APPARATUS FOR PROCESSING GARLIC
5 Claims, 1 Drawing Fig.

[52] U.S. Cl. .................................................. 99/140 R, 99/204, 99/246
[51] Int. Cl. .................................................. A23l 1/22, A23b 7/02
[50] Field of Search .......................................... 99/204, 140, 246; 424/195

[56] References Cited

UNITED STATES PATENTS

| 2,374,425 | 4/1945 | De Weerth | 99/246 |
| 2,539,157 | 1/1951 | Page | 99/68 |
| 3,082,310 | 3/1963 | Sakamoto | 219/19 |
| 3,326,698 | 6/1967 | Sakamoto | 99/140 |

FOREIGN PATENTS

| 908,376 | 10/1962 | Great Britain | 99/140 |

*Primary Examiner*—Morris O. Wolk
*Assistant Examiner*—Warren Bovee
*Attorney*—McGlew and Toren ABSTRACT: A method and apparatus for processing garlic wherein the garlic is heated in a closed volume with agitation for uniform heating under nonoxidizing conditions to obtain its solid and volatile components. The volatile component is removed from the closed volume and is separated into its liquid and gaseous fractions. The liquid fraction is collected and at the same time dust is removed from the gaseous fraction and collected.

PATENTED OCT 26 1971
3,615,599
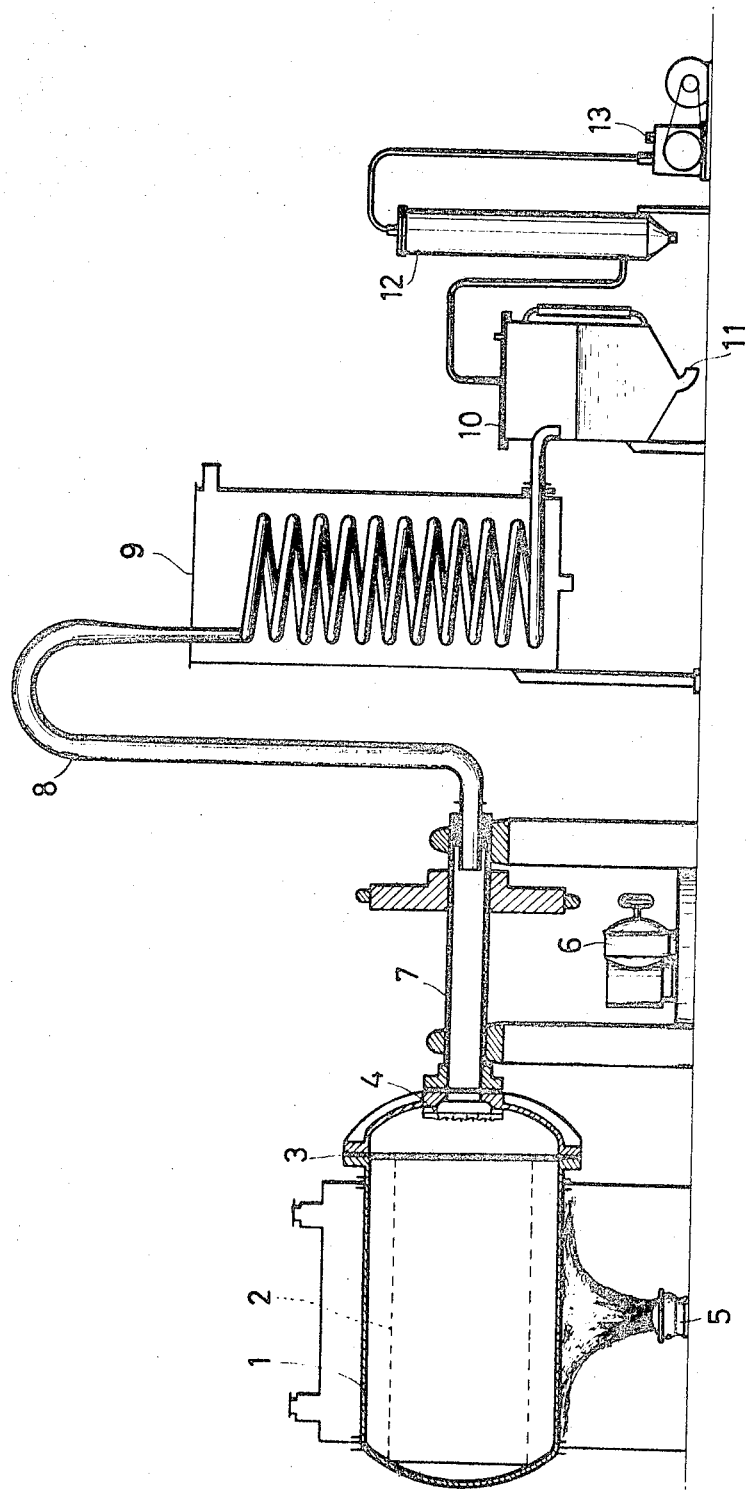
INVENTORS
YOSHIZO SAKAMOTO
KAZUYASU SAKAMOTO
BY Marblau and Toren
ATTORNEYS

METHOD OF AND APPARATUS FOR PROCESSING GARLIC

SUMMARY OF THE INVENTION

The present invention relates to a method of and an apparatus for processing garlic wherein raw garlic is subjected to dry distillation under a vacuum for separately collecting the dry distillate, which has known beneficial effects, and the liquid distillate which has excellent sterilizing effects.

The inventors have confirmed the fact that all vegetables including medicinal herbs without exception give off either an odor or an aroma when injured by cutting or splitting, and that air enters into such vegetables from the wound and causes oxidation. With the oxidizing effect the specific effective elements which contain beneficial substances are transformed into secondary substances giving off an aroma or odor, thus the valuable benefits of the herbs, are substantially lost. The inventors have already manufactured an inodorous garlic product having beneficial uses, as published in the U.S. Pat. No. 3,082,910, by heating raw garlic at a low temperature in a closed heating kettle in a nonoxidizing atmosphere and either vibrating or rotating the kettle and thus partly carbonizing the garlic without injuring its surface.

However, the method of the above invention has certain shortcomings in that its manufacturing process is relatively complicated and, further, it takes at least 12 to 13 hours for the partial carbonization process and finishing, and it is not suitable for mass-production.

Therefore, the present inventors have tried such other methods as solution processing of garlic and pulverizing and squeezing garlic either in a vacuum or in the presence of an inert gas, however, though employing these methods they have not been able to obtain products having satisfactory benefits.

As a result of the above, it has been discovered that the method of uniformly partly carbonizing raw garlic which is as fresh as possible and has its epidermis peeled off without having its surface injured, by heat treating the garlic at a certain temperature in a nonoxidizing atmosphere or in a vacuum can produce a garlic herb product having excellent effects. The inventors have succeeded in completing the present invention which is suitable for use in mass production by employing dry distillation method. The present invention also provides an apparatus suitable for such method.

The method of processing garlic according to the present invention is as follows:

Raw garlic, which is as fresh as possible, is placed in a dry distillation vacuum kettle, without drying, with its epidermis completely peeled off without injuring its surface. The garlic is subjected to a dry distillation treatment under vacuum at a low temperature, preferably at a temperature not higher than 250° C. by such heating means as a burner, electrical heat or other suitable heat source and the garlic is given a vibration or rotation action, and the dry distillate and the liquid distillate products are separately collected after the volatile components are cooled and condensed, the dry distillate product is equivalent to the half carbonized garlic uniformly heat treated while it is rotated or vibrated as in U.S. Pat. No. 3,082,310. Adequate amounts of finely pulverized pearl shell as a calcium source and as a vitamin, are added to this garlic product which is finely pulverized by some adequate means, and thus provides a charred garlic product in powder form, or it may be molded by pelletizing in the presence of an adequate molding agent.

On the other hand, the liquid distillate can be used as liquid to obtain benefits similar to those of the dry distillate.

This method has the advantage of being able to obtain concurrently both the distillate and the charred garlic powder products. A further advantage exists in the fact that the liquid distillate has sterilizing power and is useful as a sterilizing agent for plants and for other agricultural uses.

Now, the present invention will be further explained referring to the drawings.

BRIEF DESCRIPTION OF THE DRAWING

The drawing is a view, partly in section of a preferred embodiment of the present invention.

DETAILED DESCRIPTION OF THE INVENTION

In the drawing, (1) is a rotary cylindrical kettle of direct firing lateral type which can be closed air tight, it is supported by a hollow shaft (7) and is rotated by an electric motor (6). The rotatable kettle (1) has a cylindrical inner tube (2) made of multiperforated plate spaced within it, and several ribs (not shown) are provided in the space between the kettle (1) and the tube (2). The basic raw garlic is uniformly placed between the kettle (1) and the tube (2), and after closing the air tight door (3) of the kettle, the air within the entire apparatus is exhausted by a vacuum pump (13). After a vacuum has been established within the apparatus, the burner (5) is lighted and the electric motor (6) is started. The garlic, is heated evenly by the combined effect of the burner, the rotation of the kettle, and the distribution of the garlic by the ribs in the space between the kettle and the tube. The heat evaporates the volatile elements in the garlic without any oxidation occurring since the inside of the kettle is kept under a vacuum. The garlic, after its volatile elements are evaporated can be collected as a charred product (the dry distillate).

The volatile elements are transferred by the suction of the vacuum pump (13), through filter (4), hollow shaft (7) and conducting pipe (8), and entering into a spiral condenser (9) of the vertical water cooling type, where it is separated into its gas and liquid fractions, then the liquid is collected in a distillate received (10), and it is removed through outlet (11). The remaining gas is, after going through a dust collector (12), is exhausted by the vacuum pump (18). Thus, the inside of the kettle (1) and the remainder of the apparatus is always kept under a vacuum.

Since dry distillation kettle is of the direct firing type, it has improved thermal efficiency, and can be operated less expensively as compared to conventional electrical type heaters. Because the garlic is uniformly heated its moisture content can be effectively evaporated by the rotation of the kettle, and furthermore, the portion containing the beneficial elements vaporized from the garlic bulbs can be collected by cooling within the condenser (9).

At the same time, the considerable time and effort low operating efficiency and ununiformity of quality which have been experienced previously can be prevented by the method and apparatus of the present invention. The dry distillation can be effected simply, quickly and in an improved manner, thus dry distillate (charred solid product) and liquid distillate of good quality can be obtained in a mass-production system.

When 30 kg. of garlic were processed by dry distillation with the described apparatus, 6.5 kg. of dry distillate and 20l. of liquid distillate were obtained.

As an agricultural chemical, the liquid component of the garlic is useful for disinfecting seeds and seedlings, for promoting germination, for disinfecting agricultural products and fruits, and also as fertilizer.

I claim:

1. Method of processing garlic for separating the garlic into a dry component and a liquid component comprising the steps of removing the epidermis from bulbs of fresh garlic and exposing the surfaces of the whole raw cloves of fresh garlic contained in the bulbs without injuring the surfaces, providing a closed volume containing an annular space concentrically disposed about and separated from a central space with communication between the annular space and the central space for the passage therebetween of the volatile component of the garlic which is generated in the processing steps, placing the whole cloves of fresh garlic within the annular space so that they are retained therein, establishing a vacuum within the closed volume, applying heat to the exterior of the closed volume for heating the garlic at a temperature below 250° C. for separating the garlic into its solid and volatile components, agitating the closed volume for effecting a uniform heating of the garlic, withdrawing the volatile component of the garlic under a vacuum from the central space to a location exteriorly of the closed volume and filtering the withdrawn volatile component as it is removed from the central space, condensing the volatile component while maintaining vacuum, separating the condensed volatile component into its liquid and gaseous fractions, collecting the condensed liquid fraction of the volatile component, removing dust from the gaseous fraction of the volatile component, exhausting the gaseous fraction, and grinding the solid component of the garlic into a powdered dry component.

2. Method of processing garlic, as set forth in claim 1, wherein the step of agitating the closed volume comprises rotating the closed volume about the central axis of the central space therein.

3. Apparatus for processing garlic from which the epidermis has been removed leaving whole uncut garlic cloves for obtaining the solid and volatile components thereof, comprising a cylindrical closed container, a tubular shaped perforated wall means disposed coaxially within and spaced inwardly from said container forming an annular space therebetween for holding the garlic to be processed and a central space defined within said wall means into which the volatile components of the garlic flow from said annular space, heating means located exteriorly of and adjacent the surface of said container for supplying heat thereto for indirectly heating the garlic within said annular space in said container, means for rotating said container about the central axis of said annular space for attaining uniform heating of the garlic in said annular space, duct means in communication with the central space in said container for removing the volatile components of the garlic therefrom, a vacuum pump connected to said duct means at a position spaced from said container for establishing a vacuum within said container and duct means for assisting in the removal of the volatile components from said central space, a condenser located in said duct means and disposed in communication with said vacuum pump for receiving and condensing the volatile components from said central space, means positioned in advance of said condenser for filtering the volatile components removed from said central space, and a vessel in communication with said vacuum pump and arranged to receive the condensed volatile components from said condenser and to separate the condensed volatile components into a gaseous fraction and a liquid fraction.

4. Apparatus for processing garlic, as set forth in claim 3, wherein said vessel having a liquid outlet and a gaseous outlet, a dust collector in communication with said vacuum pump is connected to the gaseous outlet from said vessel for receiving the gaseous fraction of the volatile components of garlic for removing dust from the gaseous fraction.

5. Apparatus for processing garlic, as set forth in claim 3, wherein a hollow rotating shaft is secured to said container in alignment with the central axis of said annular space, said shaft is disposed in communication with the central space within said container and with said duct means for withdrawing the volatile components from the central space and delivering them into said duct means, an electric motor operatively arranged to rotate said hollow shaft, and a filter disposed across the end of said hollow shaft communicating with the central space in said container for filtering the volatile component of the garlic as they are withdrawn from the container.

* * * * *